US007580226B2

(12) United States Patent
Yao et al.

(10) Patent No.: US 7,580,226 B2
(45) Date of Patent: Aug. 25, 2009

(54) METHOD AND MECHANISM OF THE PZT MICRO-ACTUATOR APPLICATION FOR THE MAGNETIC HEAD GIMBAL ASSEMBLY OF THE HARD DISK DRIVER

(75) Inventors: Ming Gao Yao, Dongguan (CN); Masashi Shiraishi, Kowloon (CN); Yi Ru Xie, Dongguan (CN)

(73) Assignee: SAE Magnetics (H.K.) Ltd., Shatin, N.T. (HK)

( * ) Notice: Subject to any disclaimer, the term of this patent is extended or adjusted under 35 U.S.C. 154(b) by 862 days.

(21) Appl. No.: 10/351,082

(22) Filed: Jan. 23, 2003

(65) Prior Publication Data

US 2004/0037009 A1 Feb. 26, 2004

(30) Foreign Application Priority Data

Aug. 26, 2002 (CN) .................. PCT/CN02/00588

(51) Int. Cl.
*G11B 5/56* (2006.01)
(52) U.S. Cl. .................................................. 360/294.4
(58) Field of Classification Search ............. 360/294.4, 360/234.5, 294.5, 244.5, 294.3, 294.6, 245.3, 360/245.4
See application file for complete search history.

(56) References Cited

U.S. PATENT DOCUMENTS

| 6,198,606 | B1 | | 3/2001 | Boutaghou et al. ........ 360/294.3 |
| 6,215,629 | B1 | * | 4/2001 | Kant et al. .................. 360/290 |
| 6,320,730 | B1 | * | 11/2001 | Stefansky et al. ........ 360/294.4 |
| 6,362,939 | B1 | * | 3/2002 | Crane et al. ............. 360/294.5 |
| 6,376,964 | B1 | * | 4/2002 | Young et al. ................. 310/311 |
| 6,414,823 | B1 | * | 7/2002 | Crane et al. ............. 360/294.5 |
| 2001/0048573 | A1 | * | 12/2001 | Kawai et al. ............. 360/234.5 |
| 2002/0126420 | A1 | * | 9/2002 | Yao et al. ................. 360/294.4 |

FOREIGN PATENT DOCUMENTS

| CN | 1276593 A | 12/2000 |
| CN | 1288559 T | 3/2001 |
| CN | 1357880 A | 7/2002 |

* cited by examiner

*Primary Examiner*—Mark Blouin
(74) *Attorney, Agent, or Firm*—Kenyon & Kenyon LLP (57) ABSTRACT

A system and method using a framing assembly to provide support for a micro-actuator and allow the micro-actuator to be connected to a suspension assembly is disclosed. In one embodiment, the framing assembly consists of a base with two arms attached. In a further embodiment a crosspiece connects the two arms. In a further embodiment, the framing assembly is metal and have strips of piezoelectric material attached to the arms.

27 Claims, 7 Drawing Sheets

METHOD AND MECHANISM OF THE PZT MICRO-ACTUATOR APPLICATION FOR THE MAGNETIC HEAD GIMBAL ASSEMBLY OF THE HARD DISK DRIVER

BACKGROUND INFORMATION

The present invention relates to magnetic hard disk drives. More specifically, the present invention relates to a method of mounting a slider and a micro-actuator on a head arm assembly.

Figure 1:
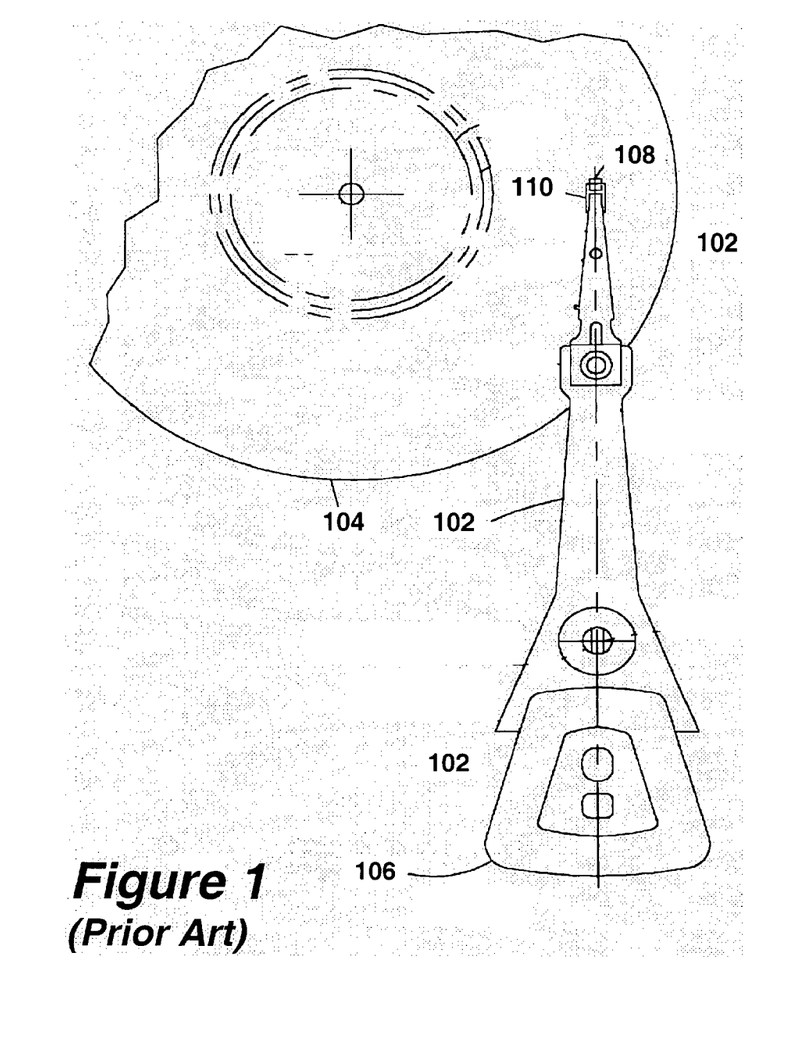
FIG. 1 provides an illustration of an internal view of a hard disk drive including a drive arm configured to read from and write to a magnetic hard disk as used in the art.

In the art today, different methods are utilized to improve recording density of hard disk drives. FIG. 1 provides an illustration of a typical disk drive with a typical drive arm 102 configured to read from and write to a magnetic hard disk 104. Typically, voice-coil motors (VCM) 106 are used for controlling a hard drive's arm 102 motion across a magnetic hard disk 106. Because of the inherent tolerance (dynamic play) that exists in the placement of a recording head 108 by a VCM 106 alone, micro-actuators 110 are now being utilized to 'fine-tune' head 108 placement. A VCM 106 is utilized for course adjustment and the micro-actuator 110 then corrects the placement on a much smaller scale to compensate for the VCM's 106 (with the arm 102) tolerance. This enables a smaller recordable track width, increasing the 'tracks per inch' (TPI) value of the hard drive (increased drive density).

Figure 2:
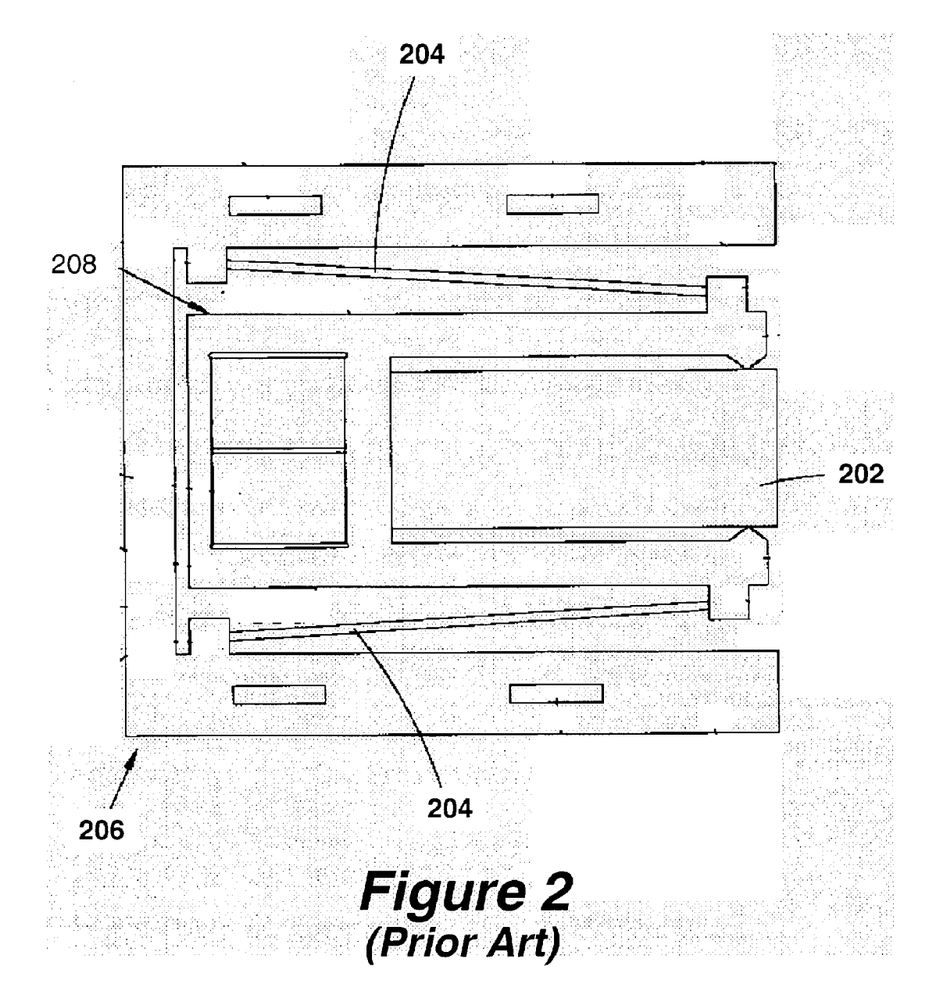
FIG. 2 provides an illustration of a micro-actuator as used in the art.

FIG. 2 provides an illustration of a micro-actuator as used in the art. Typically, a slider 202 (containing a read/write magnetic head; not shown) is utilized for maintaining a prescribed flying height above the disk surface 104 (See FIG. 1). Micro-actuators may have flexible beams 204 connecting a support device 206 to a slider containment unit 208 enabling slider 202 motion independent of the drive arm 102 (See FIG. 1). An electromagnetic assembly or an electromagnetic/ferromagnetic assembly (not shown) may be utilized to provide minute adjustments in orientation/location of the slider/head 202 with respect to the arm 102 (See FIG. 1).

Figure 3:
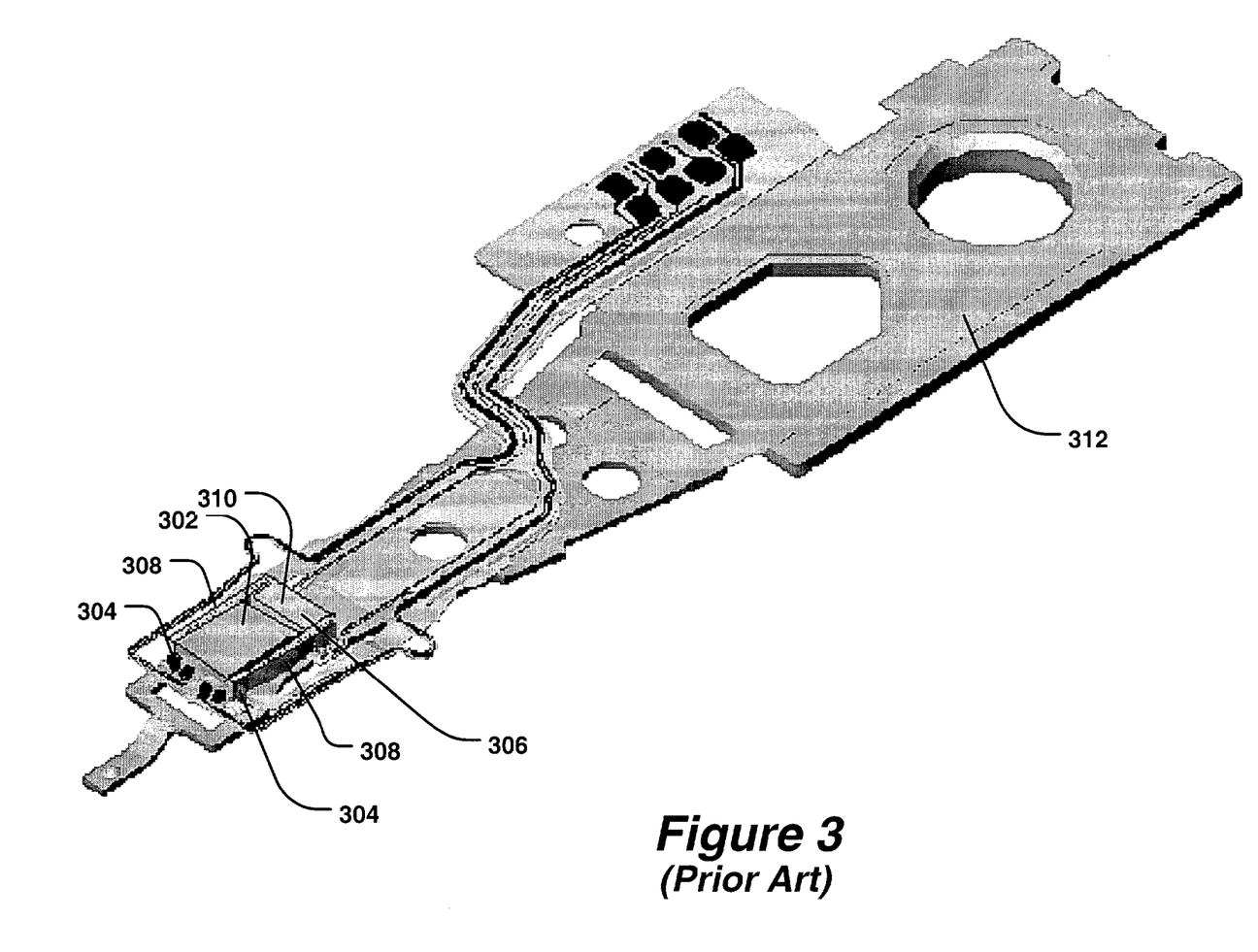
FIG. 3 describes a hard disk drive head gimbal assembly (HGA) with a 'U' shaped micro-actuator under principles of the present invention.

Illustrated in an upside-down orientation, FIG. 3 describes one embodiment of a hard disk drive head gimbal assembly (HGA) with a 'U'-shaped micro-actuator. In one embodiment, a slider 302 is bonded at two points 304 to a 'U'-shaped micro-actuator 306. In a further embodiment, the 'U'-shaped micro-actuator has a piezoelectric Lead Zirconate Titanate (PZT) beam (arm) 308 on each side of a Zirconia support frame (actuator base) 310. The micro-actuator 306 is coupled to a suspension 312.

Developing a method of coupling the micro-actuator to the HGA without distortion is difficult. Distortion of the micro-actuator can weaken its structure, reducing effectiveness and making the micro-actuator more vulnerable to shocks. Distortion can also increase the likelihood of particle generation. What is needed is a micro-actuator design that allows for several variations without sacrificing shock performance or increasing particle generation.

DETAILED DESCRIPTION

A system and method using a framing assembly to provide support for a micro-actuator and a magnetic read/write head and allow the micro-actuator and head to be connected to a suspension assembly is disclosed. In one embodiment, the framing assembly includes a base with two arms attached. In a further embodiment a crosspiece connects the two arms. In a further embodiment, the framing assembly is metal and has strips of piezoelectric material attached to the arms.

Figure 4A:
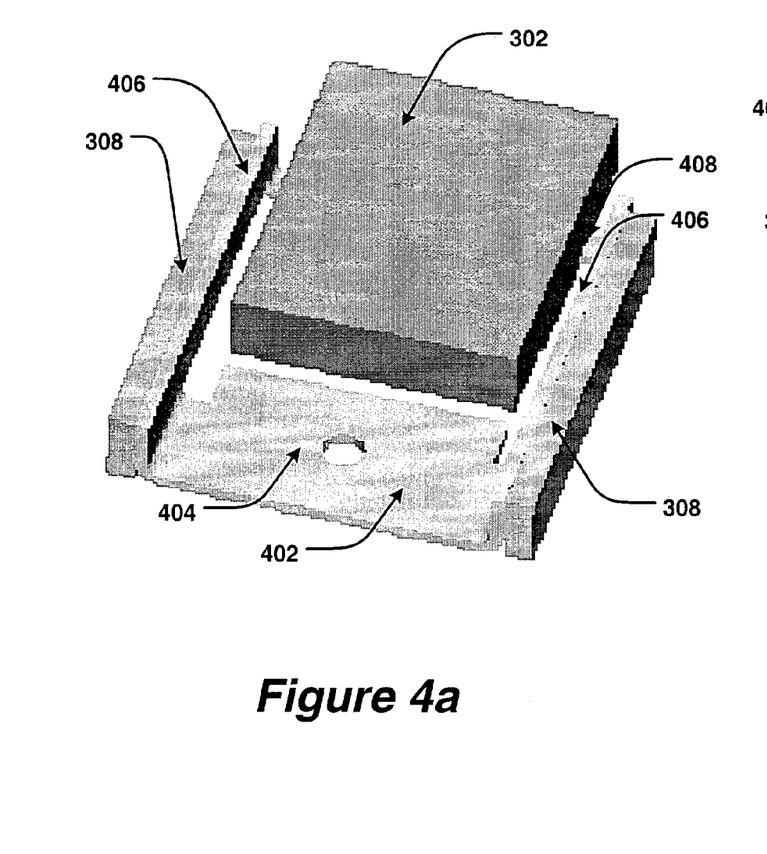
FIGS. 4a-b provide an illustration of a metal frame PZT micro-actuator.
Figure 4B:
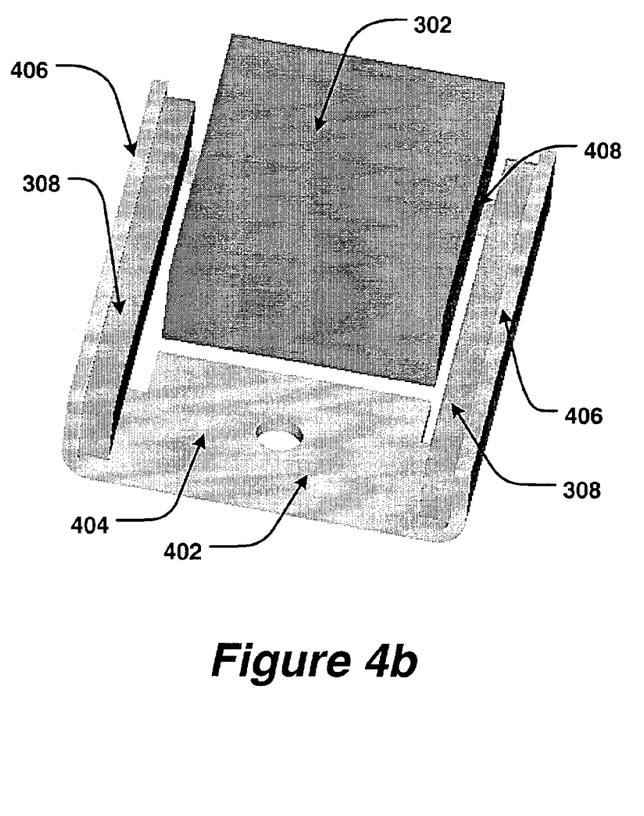

One embodiment of a micro-actuator is illustrated in FIG. 4a. A framing assembly 402 is coupled to a magnetic read/write head 302. In one embodiment, the framing assembly has a base 404 with a pair of arms 406 extending from the base on opposite sides. The base 404 is coupled to a suspension assembly on the head gimbal assembly. Additional pieces may be coupled to the base. In a further embodiment, strips of piezoelectric Lead Zirconate Titanate (PZT) material 308 are attached to the exterior of the arms 406. In one embodiment, a crosspiece 408 connects the first arm 406 to the second arm 406, from an end opposite the base 404. The crosspiece can maintain 408 alignment of the arms as well as supporting the magnetic read/write head. In one embodiment, the framing assembly 402 is a metal frame. An alternate embodiment of a micro-actuator is illustrated in FIG. 4b. In this alternate embodiment, the strips of piezoelectric material 308 are attached to the interior of the arms 406.

Figure 5A:
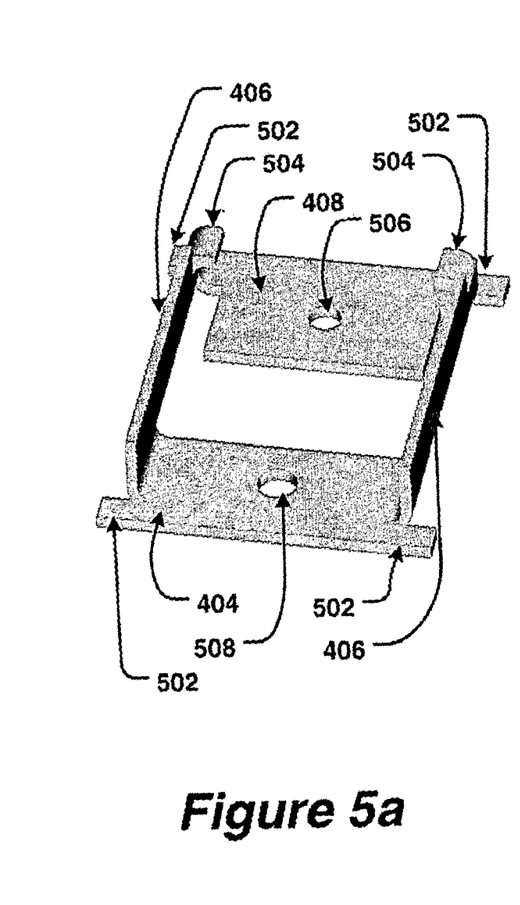
FIGS. 5a-c provide an illustration of a method of coupling the magnetic read/write head to the framing assembly.
Figure 5B:
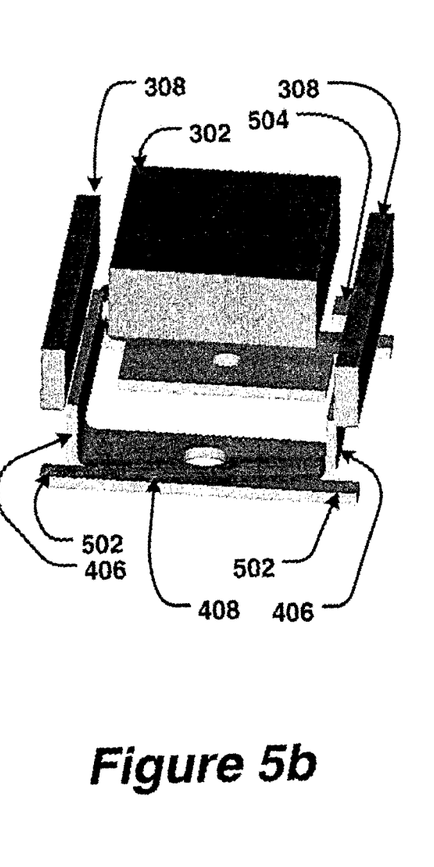
Figure 5C:
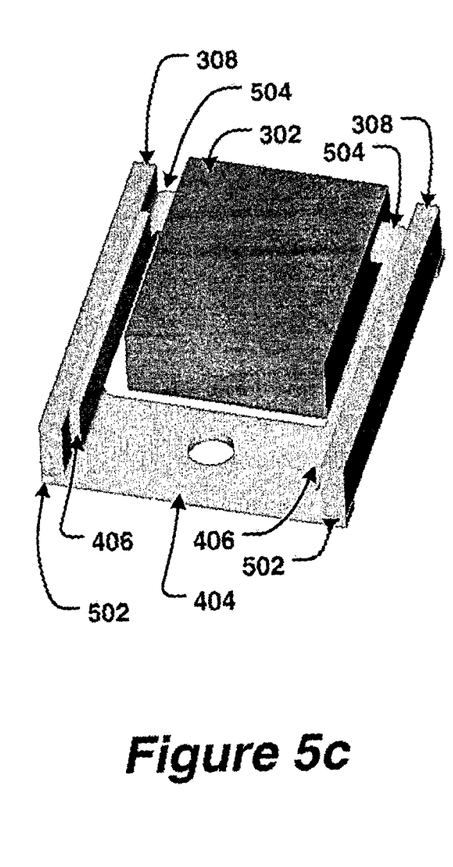

One method of coupling the magnetic read/write head to the framing assembly is illustrated in FIG. 5. One embodiment of a framing assembly is shown in FIG. 5a. In this embodiment, the framing assembly has four PZT supports 502 extending from the crosspiece 408 and base 404. In a further embodiment, a positioning support 504 extends normally from each of the arms 406. In one embodiment, a first hole 506 in the crosspiece 408 allows the introduction of a bonding agent between the base and the magnetic read/write head to firmly couple the head in place. In a further embodiment, a second hole 508 in the base 404 allows the introduction of the bonding agent between the base 404 and the suspension assembly or between the base 404 and any other item attached to the framing assembly. The bonding agent could be an ultraviolet cured epoxy, an anisotropic conductive film (ACF), a thermoplastic adhesive paste, a thermoplastic adhesive film, or another bonding agent. Examples of a thermoplastic adhesive paste include silver filled electrically conductive paste, aluminum nitride filled thermally charged paste, and non-filled dielectric interposer paste. Examples of a thermoplastic adhesive film include silver filled electrically conductive film, aluminum nitride filled thermally charged film, non-filled dielectric interposer film, and aluminum filled low flow dielectric film. The strips of PZT material 308 and the magnetic read/write head 302 are coupled to the framing assembly 402 in FIG. 5b. A strip of PZT material 308 is coupled to each of the arms 406, the strip 308 resting on the PZT supports 502. The head 302 is coupled to the crosspiece 408, with the positioning supports 504 maintaining alignment between the arms 406. The completed micro-actuator is shown in FIG. 5c.

Figure 6A:
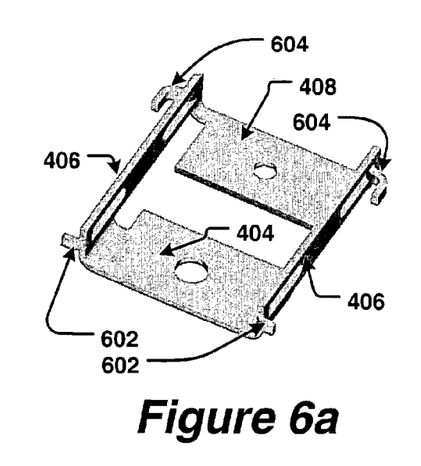
FIGS. 6a-c provide an illustration of a first alternate method of coupling the magnetic read/write head to the framing assembly.
Figure 6B:
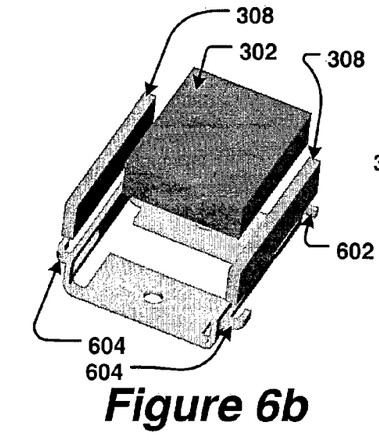
Figure 6C:
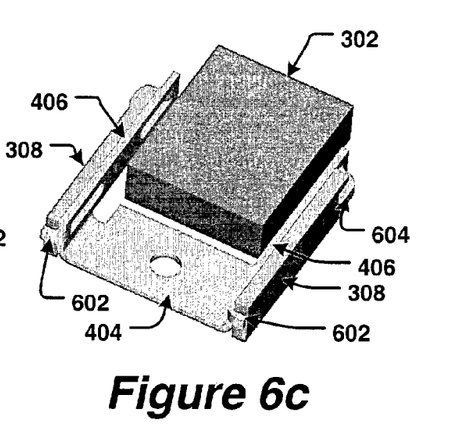

One alternative embodiment of coupling the magnetic read/write head to the framing assembly is illustrated in FIGS. 6a-c. A passive support 602 extends from each arm 406 at the end near the base 404. A gripping support 604 extends from each arm near the crosspiece 408. The strips of PZT material 308 and the magnetic read/write head 302 are coupled to the framing assembly in FIG. 6b. A strip of PZT material 308 is coupled to each of the arms 406. The gripping support 604 holds the PZT strip 308 in place, pushing the strip 308 against the passive support 602. The head 302 is coupled to the crosspiece 408, with no contact between the arms 406 and the head 302. The completed micro-actuator is shown in FIG. 6c.

Figure 7A:
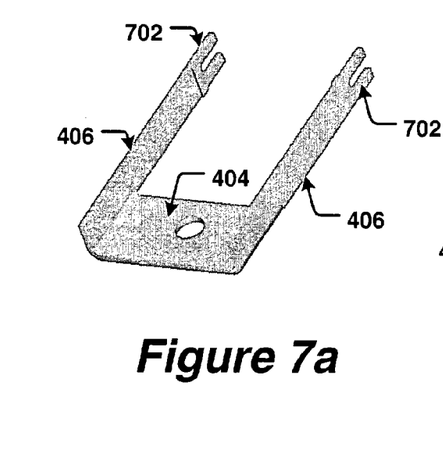
FIGS. 7a-c provide an illustration of a second alternate method of coupling the magnetic read/write head to the framing assembly.
Figures 7B, 7C:
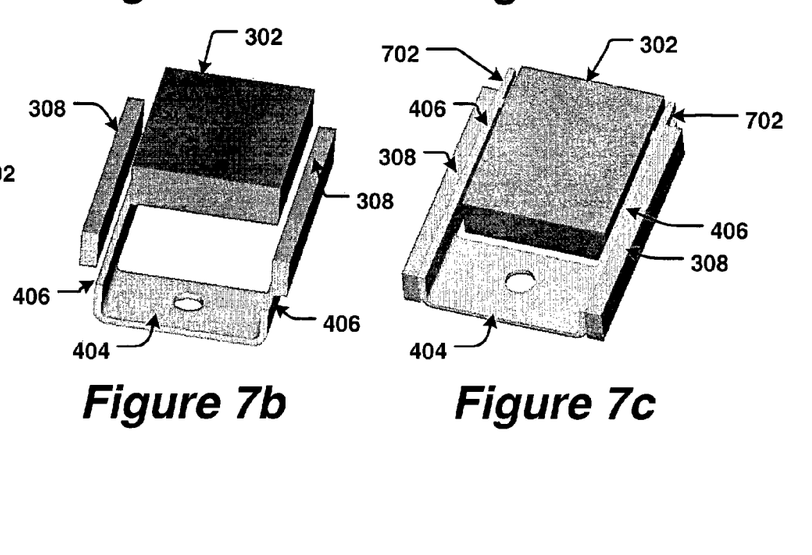

Another alternative embodiment of coupling the magnetic read/write head to the framing assembly is illustrated in FIGS. 7a-c. This framing assembly has two arms 406 extending from the base 404, with no crosspiece connecting the two arms 406. A slot 702 is present at the end of each arm 406. No supports are present on the arm. The strips of PZT material 308 and the magnetic read/write head 302 are coupled to the framing assembly in FIG. 7b. A strip of PZT material 308 is coupled to the exterior of each of the arms 406. The head 302 is coupled between the arms 406 at the end opposite the base 404. Ultraviolet-cured epoxy, or some other bonding agent, is introduced between the arms 406 and the head 302, using the slot 702 at the end of each arm 406. In one embodiment, a parallel space exists between the arms 406 and the head 302 in the area not covered by the bonding agent. The completed micro-actuator is shown in FIG. 7c.

Figures 8A, 8B, 8C:
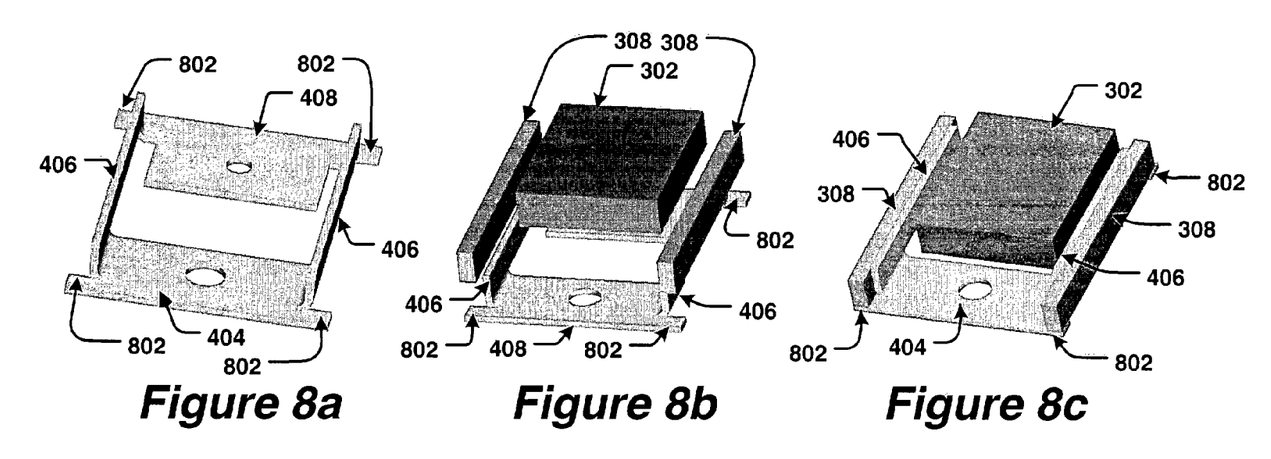
FIGS. 8a-c provide an illustration of a third alternate method of coupling the magnetic read/write head to the framing assembly.

Another alternative embodiment of coupling the magnetic read/write head to the framing assembly is illustrated in FIGS. 8a-c. The framing assembly has four PZT supports 802 extending from the crosspiece 408 and base 404. No positioning supports extend normally from the arms 406. The strips of PZT material 308 and the magnetic read/write head 302 are coupled to the framing assembly in FIG. 8b. A strip of PZT material 308 is coupled to each of the arms 406, the strip 308 resting on the PZT supports 802. The head 302 is coupled to the crosspiece 408, with no contact between the arms 406 and the head 302. The completed micro-actuator is shown in FIG. 8c.

Figures 9A, 9B, 9C:
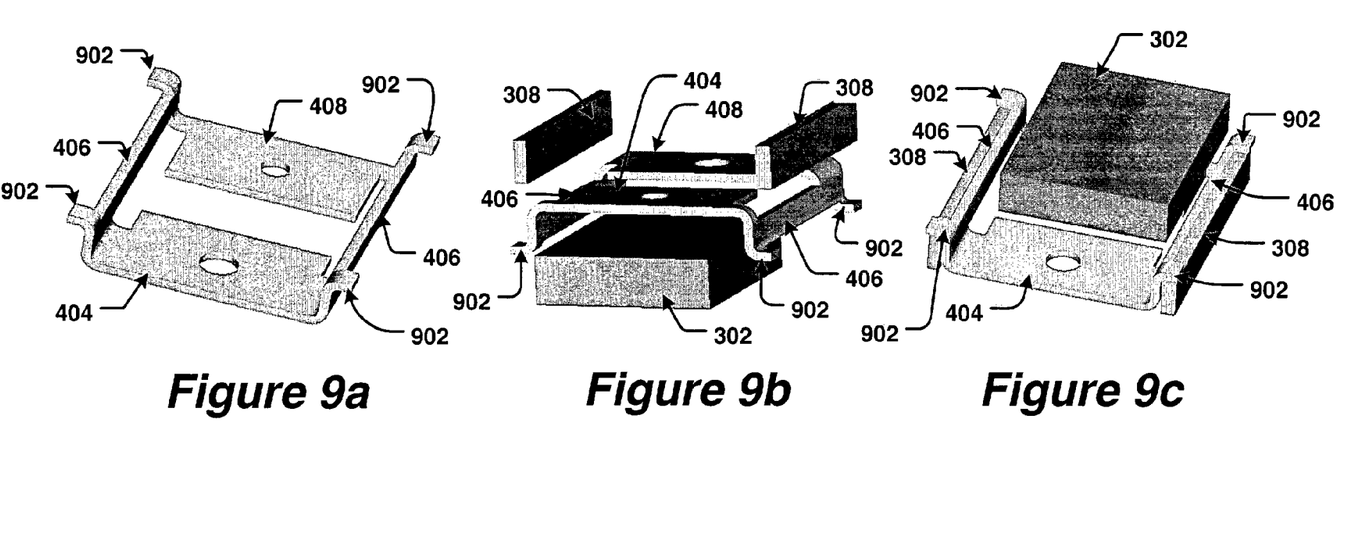
FIGS. 9a-c provide an illustration of a fourth alternate method of coupling the magnetic read/write head to the framing assembly.

Another alternative embodiment of coupling the magnetic read/write head to the framing assembly is illustrated in FIGS. 9a-c. The framing assembly has two PZT supports 902 extending from each arm 406 on the side opposite of the base 404 and crosspiece 408. The strips of PZT material 308 and the magnetic read/write head 302 are coupled to the framing assembly in FIG. 9b. A strip of PZT material 308 is coupled to each of the arms 406, the strip 308 resting on the PZT supports 902. The head 302 is coupled to the crosspiece 408 of the framing assembly on the side of the framing assembly opposite from the PZT strips 308. The completed micro-actuator is shown in FIG. 9c.

Although several embodiments are specifically illustrated and described herein, it will be appreciated that modifications and variations of the present invention are covered by the above teachings and within the purview of the appended claims without departing from the spirit and intended scope of the invention.

The invention claimed is:

1. A micro-actuator, comprising:
   a framing assembly to couple a magnetic read/write head to a suspension assembly, wherein the framing assembly includes:
      a base piece;
      a first arm coupled one end to a first side of the base; and
      a second arm coupled to a second side of the base;
      a first strip of piezoelectric actuator material coupled to the first arm; and
      a second strip of piezoelectric actuator material coupled to the second arm, wherein a first piezoelectric support element extends perpendicularly from said first arm to support said first strip of piezoelectric actuator material, and a second piezoelectric support element extends perpendicularly from said second arm to support said second strip of piezoelectric actuator material.

2. The micro-actuator of claim 1, wherein the framing assembly is comprised of metal.

3. The micro-actuator of claim 1, wherein the framing assembly further includes a crosspiece with a first end coupled to the first arm and a second end coupled to the second arm.

4. The micro-actuator of claim 1 wherein the first strip of piezoelectric actuator material is coupled to the exterior of the first arm and the second strip of actuator material is coupled to the exterior of the second arm.

5. The micro-actuator of claim 1, wherein the first strip of piezoelectric actuator material is coupled to the interior of the first arm and the second strip of piezoelectric actuator material is coupled to the interior of the second arm.

6. The micro-actuator of claim 1, wherein the magnetic read/write head is coupled to the frame by an ultraviolet-cured epoxy.

7. The micro-actuator of claim 1, wherein the magnetic read/write head is coupled to the frame by a thermoplastic adhesive paste.

8. The micro-actuator of claim 1, wherein the magnetic read/write head is coupled to the frame by a thermoplastic adhesive film.

9. The micro-actuator of claim 1, wherein the magnetic read/write head is coupled to the frame by an anisotropic conductive film.

10. A system, comprising:
    a head gimbal assembly with a suspension assembly;
    a framing assembly coupled to the suspension assembly, wherein the framing assembly includes:
       a base piece;
       a first arm coupled one end to a first side of the base; and
       a second arm coupled to a second side of the base;
    a first strip of piezoelectric actuator material coupled to the first arm;
    a second strip of piezoelectric actuator material coupled to the second arm;
    a disk containing data; and
    a magnetic read/write head coupled to the framing assembly, the magnetic read/write head to read the data from the disk, wherein a first piezoelectric support element extends perpendicularly from said first arm to support said first strip of piezoelectric actuator material, and a second piezoelectric support element extends perpendicularly from said second arm to support said second strip of piezoelectric actuator material.

11. The system of claim 10, wherein the framing assembly is comprised of metal.

12. The system of claim 10, wherein the framing assembly further includes a crosspiece with a first end coupled to the first arm and a second end coupled to the second arm.

13. The system of claim 10, wherein the first strip of piezoelectric actuator material is coupled to the exterior of the first arm and the second strip of piezoelectric actuator material is coupled to the exterior of the second arm.

14. The system of claim 10, wherein the first strip of piezoelectric actuator material is coupled to the interior of the first arm and the second strip of piezoelectric actuator material is coupled to the interior of the second arm.

15. The system of claim 10, wherein the magnetic read/write head is coupled to the frame by an ultraviolet-cured epoxy.

16. The system of claim 10, wherein the magnetic read/write head is coupled to the frame by a thermoplastic adhesive paste.

17. The system of claim 10, wherein the magnetic read/write head is coupled to the frame by a thermoplastic adhesive film.

18. The system of claim 10, wherein the magnetic read/write head is coupled to the frame by an anisotropic conductive film.

19. A method, comprising:
coupling a magnetic read/write head to a suspension assembly of a head gimbal assembly with a framing assembly, wherein the framing assembly includes:
a base piece;
a first arm coupled one end to a first side of the base; and
a second arm coupled to a second side of the base; and
using a first strip of piezoelectric actuator material coupled to the first arm and a second strip of piezoelectric actuator material coupled to the second arm to position the magnetic read/write head relative to the suspension assembly, wherein a first piezoelectric support element extends perpendicularly from said first arm to support said first strip of piezoelectric actuator material, and a second piezoelectric support element extends perpendicularly from said second arm to support said second strip of piezoelectric actuator material.

20. The method of claim 19, wherein the framing assembly is comprised of metal.

21. The method of claim 19, wherein the framing assembly further includes a crosspiece with a first end coupled to the first arm and a second end coupled to the second arm.

22. The method of claim 19, wherein the first strip of piezoelectric actuator material is coupled to the exterior of the first arm and the second strip of piezoelectric actuator material is coupled to the exterior of the second arm.

23. The method of claim 19, wherein the first strip of piezoelectric actuator material is coupled to the interior of the first arm and the second strip of piezoelectric actuator material is coupled to the interior of the second arm.

24. The method of claim 19, wherein the magnetic read/write head is coupled to the frame by an ultraviolet-cured epoxy.

25. The method of claim 19, wherein the magnetic read/write head is coupled to the frame by a thermoplastic adhesive paste.

26. The method of claim 19, wherein the magnetic read/write head is coupled to the frame by a thermoplastic adhesive film.

27. The method of claim 19, wherein the magnetic read/write head is coupled to the frame by an anisotropic conductive film.

* * * * *